(12) United States Patent
Andoh et al.

(10) Patent No.: US 8,005,630 B2
(45) Date of Patent: Aug. 23, 2011

(54) SYSTEM IDENTIFICATION DEVICE

(75) Inventors: Fukashi Andoh, Kitakyushu (JP); Hiroshi Nakamura, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 650 days.

(21) Appl. No.: 11/997,674

(22) PCT Filed: Jul. 27, 2006

(86) PCT No.: PCT/JP2006/314894
§ 371 (c)(1),
(2), (4) Date: Feb. 1, 2008

(87) PCT Pub. No.: WO2007/018045
PCT Pub. Date: Feb. 15, 2007

(65) Prior Publication Data
US 2010/0223024 A1 Sep. 2, 2010

(30) Foreign Application Priority Data
Aug. 10, 2005 (JP) .................................. 2005-232248

(51) Int. Cl.
*G01L 1/00* (2006.01)
*G01L 3/00* (2006.01)
*G01L 5/00* (2006.01)
*G01P 3/00* (2006.01)
*G01C 19/00* (2006.01)

(52) U.S. Cl. .......................... 702/41; 702/145; 702/151

(58) Field of Classification Search .................... 702/41, 702/145, 151
See application file for complete search history.

(56) References Cited

U.S. PATENT DOCUMENTS
| | | | | |
|---|---|---|---|---|
| 6,515,442 B1* | 2/2003 | Okubo et al. | ................. | 318/560 |
| 7,626,351 B2* | 12/2009 | Hagihara | ................. | 318/617 |
| 2004/0179831 A1* | 9/2004 | Tsuruta | ................. | 388/825 |

FOREIGN PATENT DOCUMENTS
| | | |
|---|---|---|
| JP | 07-333084 A | 12/1995 |
| JP | 2005-086841 A | 3/2005 |

* cited by examiner

*Primary Examiner* — Michael P Nghiem
(74) *Attorney, Agent, or Firm* — Sughrue Mion, PLLC

(57) ABSTRACT

A system identification device having a position amplitude calculator outputting a position amplifier; a position torque command integral value multiplier outputting a position torque command integral value multiplication value; a position torque command integral value average calculator inputting the position torque command integral value multiplication value and then outputting an average of a position torque command integral value; a speed torque command integral value multiplier outputting a speed torque command integral value multiplication value; a speed torque command integral value average calculator inputting the speed torque command integral value multiplication value and then outputting an average of a speed torque command integral value; and a first inertia moment and viscous friction calculator calculating identification values of inertia moment and viscous friction from the position amplitude, the average of the position torque command integral value and the average of the speed torque command integral value.

10 Claims, 7 Drawing Sheets

SYSTEM IDENTIFICATION DEVICE

TECHNICAL FIELD

The present invention relates to a system identification device for identifying an inertia moment in an electric motor and a viscous friction.

BACKGROUND ART

A system identification device according to the related art identifies an inertia moment of a control target by dividing, by an integral time of an integrator, a steady-state value of a command torque difference Nth-order integral value to be an Nth-order time integral value of a signal obtained by subtracting an equivalent IP control system command torque from a PI control system command torque (see e.g., Patent Document 1).

FIG. 8 is a block diagram showing a system identification device according to the related art.

In FIG. 8, 801 denotes a first mixer, 802 denotes a proportional amplifier, 803 denotes an integrator, 804 denotes a second mixer, 805 denotes a control target, 806 denotes a control target Coulomb friction, 807 denotes a first-order lag filter, and 808 denotes an Nth-order integration.

A structure and operation of the system identification device according to the related art will be described below with reference to FIG. 8.

The first mixer 801 outputs a signal obtained by subtracting a speed from a speed command. The proportional amplifier 802 inputs the output of the first mixer 801 and outputs a signal obtained by amplifying the input signal. The integrator 803 inputs the output of the proportional amplifier 802 and then outputs a PI control system command torque to be a value obtained by adding the input signal and a 1st-order time integral value amplification value of the input signal. The second mixer 804 outputs a value obtained by adding the PI control system command torque and an output of the control target Coulomb friction 806. The control target 805 inputs the output of the second mixer 804 and then outputs the speed. The control target Coulomb friction 806 inputs the speed and then outputs a signal having a constant absolute value and a reverse sign to that of the input signal. The first order lag filter 807 inputs the PI control system command torque and then outputs an equivalent IP control system command torque. The Nth-order integration 808 inputs a signal obtained by subtracting the equivalent IP control system command torque from the PI control system command torque and then outputs a command torque difference Nth-order integral value to be an Nth-order time integral value of the input signal.

As described the above structure, a steady-state value of the command torque difference Nth-order integral value for the speed command having a constant sign is divided by the integral time of the integrator 803 to identify an inertia moment of the control target 805.

Patent Document 1: JP-A-7-333084 Publication (Page 8, FIG. 8(a))

DISCLOSURE OF THE INVENTION

Problems to be Solved

However, the system identification device according to the related art uses a speed command having a constant sign. For this reason, there is a problem in that a sufficiently large movable range is required for identifying an inertia moment, and an inertia moment of an electric motor having a movable range restricted cannot be identified.

In consideration of the above problem, an object of the invention provides a system identification device capable of suppressing the influence of a constant torque disturbance and suppressing the influence of a noise in a torque command for a speed control system and a position control system having any linear control law using any periodic speed command or periodic position command, thereby identifying an inertia moment in an electric motor and a viscous friction through only a very small operation in a short time. Furthermore, an object of the invention provides a system identification device capable of suppressing the influence of a constant torque disturbance for any linear control law using any periodic speed command or periodic position command by only a simple calculation, thereby identifying an inertia moment in an electric motor and a viscous friction through only a very small operation in a short time.

Means for Solving the Problems

In order to solve the problems, a first aspect of the invention is directed to a system identification device comprising:

a speed command generator for outputting a speed command;

a differentiator for inputting a position of an electric motor detected by a position detector and then outputting a speed;

a speed controller for inputting the speed command and the speed and then outputting a torque command;

a torque controller for inputting the torque command and then driving the electric motor with an electric motor current; and an inertia moment and viscous friction identifier for inputting the torque command, the position and the speed, and then calculating and outputting identification values of an inertia moment in the electric motor and a viscous friction, wherein the inertia moment and viscous friction identifier includes:

a position amplitude calculator for inputting the position and then calculating and outputting a position amplitude to be an amplitude of a fundamental frequency component of the input signal;

a position torque command integral value multiplier for inputting the position and the torque command, and then calculating and outputting a position torque command integral value multiplication value to be a multiplication value of the fundamental frequency component of the position and an Nth-order time integral value of the torque command, wherein N is set to a natural number including zero;

a position torque command integral value average calculator for inputting the position torque command integral value multiplication value and then calculating and outputting an average of a position torque command integral value to be a one-cycle average of the input signal;

a speed torque command integral value multiplier for inputting the torque command and the speed, and then calculating and outputting a speed torque command integral value multiplication value to be a multiplication value of the fundamental frequency component of the speed and the Nth-order time integral value of the torque command;

a speed torque command integral value average calculator for inputting the speed torque command integral value multiplication value, and then calculating and outputting an average of a speed torque command integral value to be a one-cycle average of the input signal; and a first inertia moment and viscous friction calculator for inputting the position amplitude, the average of the position torque command integral value and the average of the speed torque command integral value, and then calculating and outputting the identification values of the inertia moment and the viscous friction.

Moreover, a second aspect of the invention is directed to a system identification device comprising:

a position command generator for outputting a position command;

a differentiator for inputting a position of an electric motor detected by a position detector and then outputting a speed;

a position controller for inputting the position command and the position and then outputting a speed command;

a speed controller for inputting the speed command and the speed and then outputting a torque command;

a torque controller for inputting the torque command and then driving the electric motor with an electric motor current; and an inertia moment and viscous friction identifier for inputting the torque command, the position and the speed, and then calculating and outputting identification values of an inertia moment in the electric motor and a viscous friction, wherein the inertia moment and viscous friction identifier includes:

a position amplitude calculator for inputting the position and then calculating and outputting a position amplitude to be an amplitude of a fundamental frequency component of the input signal;

a position torque command integral value multiplier for inputting the position and the torque command, and then calculating and outputting a position torque command integral value multiplication value to be a multiplication value of the fundamental frequency component of the position and an Nth-order time integral value of the torque command, wherein N is set to a natural number including zero;

a position torque command integral value average calculator for inputting the position torque command integral value multiplication value and then calculating and outputting an average of a position torque command integral value to be a one-cycle average of the input signal;

a speed torque command integral value multiplier for inputting the torque command and the speed, and then calculating and outputting a speed torque command integral value multiplication value to be a multiplication value of the fundamental frequency component of the speed and the Nth-order time integral value of the torque command;

a speed torque command integral value average calculator for inputting the speed torque command integral value multiplication value, and then calculating and outputting an average of a speed torque command integral value to be a one-cycle average of the input signal; and a first inertia moment and viscous friction calculator for inputting the position amplitude, the average of the position torque command integral value and the average of the speed torque command integral value, and then calculating and outputting the identification values of the inertia moment and the viscous friction.

Furthermore, a third aspect of the invention is directed to the system identification device according to the first or second aspect of the invention, wherein the position torque command integral value multiplier and the speed torque command integral value multiplier set the Nth-order time integral value of the torque command to be a 0th-order time integral value of the torque command.

In addition, a fourth aspect of the invention is directed to the system identification device according to the first or second aspect of the invention, the position torque command integral value multiplier and the speed torque command integral value multiplier set the Nth-order time integral value of the torque command to be a 1st-order time integral value of the torque command.

Moreover, a fifth aspect of the invention is directed to the system identification device according to the first or second aspect of the invention, wherein the position amplitude calculator calculates a position fundamental frequency component to be the fundamental frequency component of the position, and then calculates and outputs the position amplitude using a Fourier transformation, the position torque command integral value multiplier calculates a position fundamental frequency component to be the fundamental frequency component of the position and a torque command fundamental frequency component to be the fundamental frequency component of the torque command using the Fourier transformation, and then calculates and outputs the position torque command integral value multiplication value to be a multiplication value of the position fundamental frequency component and an Nth-order time integral value of the torque command fundamental frequency component, and the speed torque command integral value multiplier calculates a torque command fundamental frequency component to be the fundamental frequency component of the torque command and a speed fundamental frequency component to be the fundamental frequency component of the speed using the Fourier transformation, and then calculates and outputs the speed torque command integral value multiplication value to be a multiplication value of the Nth-order time integral value of the torque command fundamental frequency component and the speed fundamental frequency component.

Furthermore, a sixth aspect of the invention is directed to the system identification device according to the first or second aspect of the invention, wherein the position amplitude calculator calculates a position fundamental frequency component to be the fundamental frequency component of the position, and then calculates and outputs the position amplitude using a band-pass filter, the position torque command integral value multiplier calculates a position fundamental frequency component to be the fundamental frequency component of the position and a torque command fundamental frequency component to be the fundamental frequency component of the torque command using the band-pass filter, and then calculates and outputs the position torque command integral value multiplication value to be a multiplication value of the position fundamental frequency component and an Nth-order time integral value of the torque command fundamental frequency component, and the speed torque command integral value multiplier calculates a torque command fundamental frequency component to be the fundamental frequency component of the torque command and a speed fundamental frequency component to be the fundamental frequency component of the speed using the band-pass filter, and then calculates and outputs the speed torque command integral value multiplication value to be a multiplication value of the Nth-order time integral value of the torque command fundamental frequency component and the speed fundamental frequency component.

In addition, a seventh aspect of the invention is directed to a system identification device comprising:

a speed command generator for outputting a speed command;

a differentiator for inputting a position of an electric motor detected by a position detector and then outputting a speed;

a speed controller for inputting the speed command and the speed and then outputting a torque command;

a torque controller for inputting the torque command and then driving the electric motor with an electric motor current; and an inertia moment and viscous friction identifier for inputting the torque command, the position and the speed, and then calculating and outputting identification values of an inertia moment in the electric motor and a viscous friction, wherein the inertia moment and viscous friction identifier includes:

a position amplitude calculator for inputting the position and then calculating and outputting a position amplitude to be an amplitude of a fundamental frequency component of the input signal; and a second inertia moment and viscous friction calculator for inputting the position amplitude and the torque command, and calculating a Fourier coefficient of the torque command by a Fourier transformation, and then calculating and outputting the identification values of the inertia moment and the viscous friction using the position amplitude and the Fourier coefficient.

Moreover, an eighth aspect of the invention is directed to a system identification device comprising:

a position command generator for outputting a position command;

a differentiator for inputting a position of an electric motor detected by a position detector and then outputting a speed;

a position controller for inputting the position command and the position and then outputting a speed command;

a speed controller for inputting the speed command and the speed and then outputting a torque command;

a torque controller for inputting the torque command and then driving the electric motor with an electric motor current; and an inertia moment and viscous friction identifier for inputting the torque command, the position and the speed, and then calculating and outputting identification values of an inertia moment in the electric motor and a viscous friction, wherein the inertia moment and viscous friction identifier includes:

a position amplitude calculator for inputting the position and then calculating and outputting a position amplitude to be an amplitude of a fundamental frequency component of the input signal; and a second inertia moment and viscous friction calculator for inputting the position amplitude and the torque command, and calculating a Fourier coefficient of the torque command by a Fourier transformation, and then calculating and outputting the identification values of the inertia moment and the viscous friction using the position amplitude and the Fourier coefficient.

Furthermore, a ninth aspect of the invention is directed to the system identification device according to the first aspect of the invention, wherein when a fundamental frequency of the speed command is represented by $\omega$, a torque command fundamental frequency component is represented by $T_{ref0}$, a position fundamental frequency component is represented by $\theta_0$, and the position amplitude is represented by A, the first inertia moment and viscous friction calculator calculates the identification values of the inertia moment J in the electric motor and the viscous friction D in accordance with the following Equations (1) and (2):

$$J = -\frac{2\overline{T_{ref0}\theta_0}}{\omega^2 A^2} \quad (1)$$

$$D = \frac{2\overline{T_{ref0}\theta_0}}{\omega^2 A^2} \quad (2)$$

In addition, a tenth aspect of the invention is directed to the system identification device according to the second aspect of the invention, wherein when a fundamental frequency of the position command is represented by $\omega$, a torque command fundamental frequency component is represented by $T_{ref0}$, a position fundamental frequency component is represented by $\theta_0$, and the position amplitude is represented by A, the first inertia moment and viscous friction calculator calculates the identification values of the inertia moment J in the electric motor and the viscous friction D in accordance with the following Equations (1) and (2):

$$J = -\frac{2\overline{T_{ref0}\theta_0}}{\omega^2 A^2} \quad (1)$$

$$D = \frac{2\overline{T_{ref0}\theta_0}}{\omega^2 A^2} \quad (2)$$

Moreover, an eleventh aspect of the invention is directed to the system identification device according to the first aspect of the invention, wherein when a fundamental frequency of the speed command is represented by $\omega$, a torque command fundamental frequency component is represented by $T_{ref0}$, a position fundamental frequency component is represented by $\theta_0$, and the position amplitude is represented by A, the first inertia moment and viscous friction calculator calculates the identification values of the inertia moment J in the electric motor and the viscous friction D in accordance with the following Equations (3) and (4):

$$J = \frac{2\overline{\int T_{ref0} dt \theta_0}}{\omega^2 A^2} \quad (3)$$

$$D = \frac{2\overline{\int T_{ref0} dt \theta_0}}{A^2} \quad (4)$$

Furthermore, a twelfth aspect of the invention is directed to the system identification device according to the second aspect of the invention, wherein when a fundamental frequency of the position command is represented by $\omega$, a torque command fundamental frequency component is represented by $T_{ref0}$, a position fundamental frequency component is represented by $\theta_0$, and the position amplitude is represented by A, the first inertia moment and viscous friction calculator calculates the identification values of the inertia moment J in the electric motor and the viscous friction D in accordance with the following Equations (3) and (4):

$$J = \frac{2\overline{\int T_{ref0} dt \theta_0}}{\omega^2 A^2} \quad (3)$$

$$D = \frac{2\overline{\int T_{ref0} dt \theta_0}}{A^2} \quad (4)$$

In addition, a thirteenth aspect of the invention is directed to the system identification device according to the seventh aspect of the invention, wherein when a fundamental frequency of the speed command is represented by ω, the position amplitude is represented by A, a Fourier coefficient of a fundamental frequency cosine component of the torque command is represented by a0, and a Fourier coefficient of a fundamental frequency sine component of the torque command is represented by b0, the second inertia moment and viscous friction calculator calculates the identification values of the inertia moment J in the electric motor and the viscous friction D in accordance with the following Equations (5) and (6):

$$J = -\frac{a_0}{\omega^2 A} \quad (5)$$

$$D = -\frac{b_0}{\omega A} \quad (6)$$

Moreover, a fourteenth aspect of the invention is directed to the system identification device according to the eighth aspect of the invention, wherein when a fundamental frequency of the speed command is represented by ω, the position amplitude is represented by A, a Fourier coefficient of a fundamental frequency cosine component of the torque command is represented by a0, and a Fourier coefficient of a fundamental frequency sine component of the torque command is represented by b0, the second inertia moment and viscous friction calculator calculates the identification values of the inertia moment J in the electric motor and the viscous friction D in accordance with the following Equations (5) and (6):

$$J = -\frac{a_0}{\omega^2 A} \quad (5)$$

$$D = -\frac{b_0}{\omega A} \quad (6)$$

ADVANTAGE OF THE INVENTION

According to the first aspect of the invention, it is possible to suppress the influence of a constant torque disturbance and to identify an inertia moment in an electric motor and a viscous friction through only a very small operation in a speed control system having any linear control law.

According to the second aspect of the invention, moreover, it is possible to suppress the influence of a constant torque disturbance and to identify an inertia moment in an electric motor and a viscous friction through only a very small operation in a position control system having any linear control law.

According to the third, ninth and tenth aspects of the invention, furthermore, it is possible to suppress the influence of a constant torque disturbance and to identify an inertia moment in an electric motor and a viscous friction through only a very small operation for any linear control law using any periodic speed command or periodic position command.

According to the fourth, eleventh and twelfth aspects of the invention, moreover, it is possible to suppress the influence of a constant torque disturbance, to control the influence of a noise in a torque command and to identify an inertia moment in an electric motor and a viscous friction through only a very small operation for any linear control law using any periodic speed command or periodic position command.

According to the fifth and sixth aspects of the invention, furthermore, it is possible to suppress the influence of a constant torque disturbance and to identify an inertia moment in an electric motor and a viscous friction through only a very small operation in a short time for any linear control law using an optional periodic speed command or periodic position command.

According to the seventh, eighth, thirteenth and fourteenth aspects of the invention, moreover, it is possible to suppress the influence of a constant torque disturbance and to identify an inertia moment in an electric motor and a viscous friction through only a very small operation in a short time for any linear control law using any periodic speed command or periodic position command through only a simple calculation.

Figure 1:
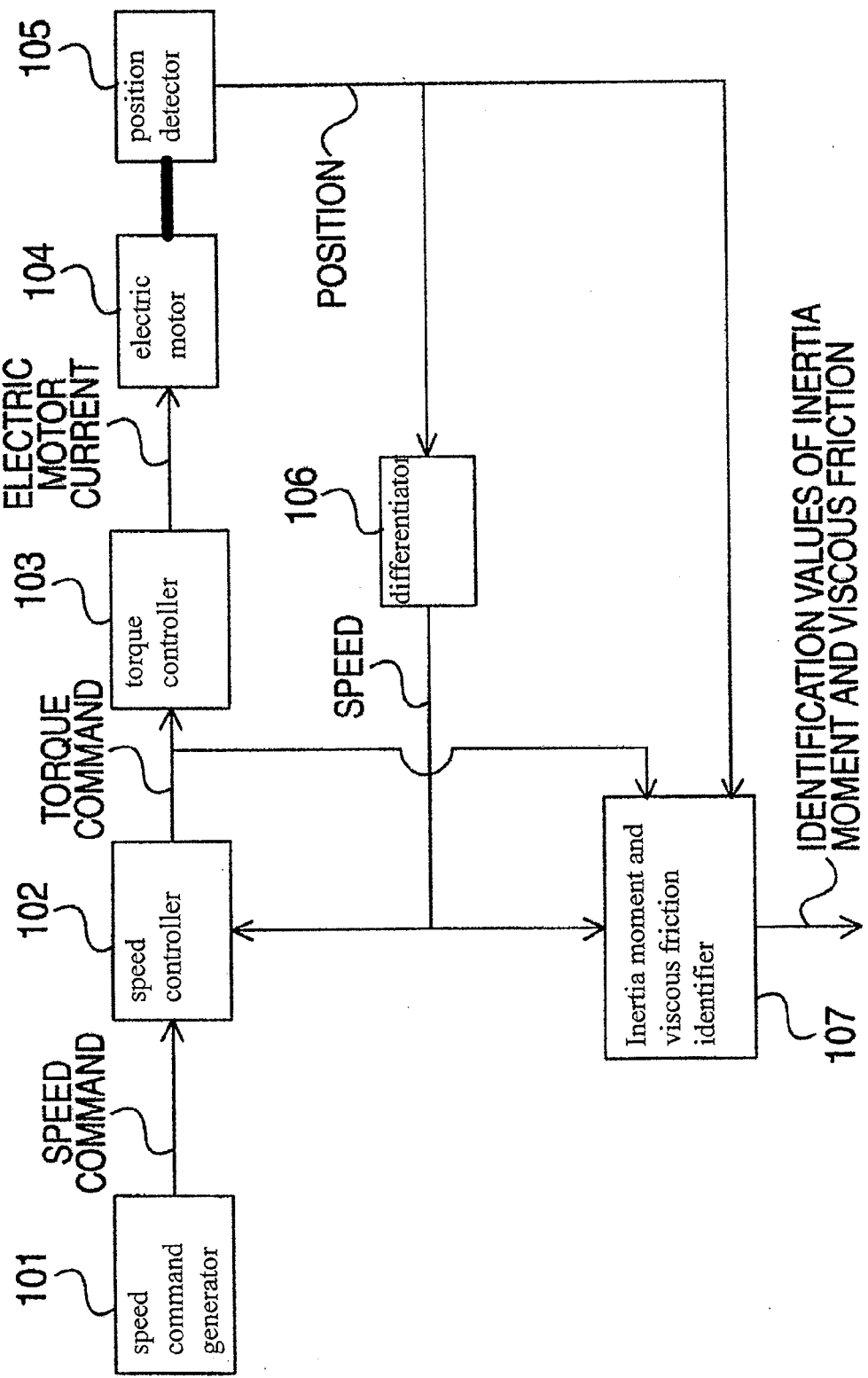
FIG. 1 is a block diagram showing a system identification device according to a first example.

DESCRIPTION OF THE DESIGNATIONS 101 speed command generator
102 speed controller
103 torque controller
104 electric motor
105 position detector
106 differentiator
107 inertia moment and viscous friction identifier
201 position amplitude calculator
202 position torque command integral value multiplier
203 position torque command integral value average calculator
204 speed torque command integral value multiplier
205 speed torque command integral value average calculator
206 first inertia moment and viscous friction calculator
301 position command generator
302 position controller
701 second inertia moment and viscous friction calculator
801 first mixer
802 proportional amplifier
803 integrator
804 second mixer
805 control target
806 control target Coulomb friction
807 first order lag filter
808 Nth-order integration

BEST MODE FOR CARRYING OUT THE INVENTION

An embodiment according to the invention will be described below with reference to the drawings.

FIRST EXAMPLE

FIG. 1 is a block diagram showing a system identification device according to a first example.

In FIG. 1, 101 denotes a speed command generator, 102 denotes a speed controller, 103 denotes a torque controller, 104 denotes an electric motor, 105 denotes a position detector, 106 denotes a differentiator, and 107 denotes an inertia moment and viscous friction identifier.

A structure of the system identification device in the first example will be described below with reference to FIG. 1.

The speed command generator 101 outputs a speed command. The speed controller 102 inputs the speed command and a speed and then outputs a torque command. The torque controller 103 inputs the torque command and then outputs an electric motor current. The electric motor 104 is driven with the electric motor current and the position detector 105 detects and outputs a position thereof. The differentiator 106 inputs the position and then outputs the speed. The inertia moment and viscous friction identifier 107 inputs the torque command, the position and the speed, and then calculates and outputs identification values of inertia moment and viscous friction to be an inertia moment in the electric motor 104 and a viscous friction.

Figure 2:
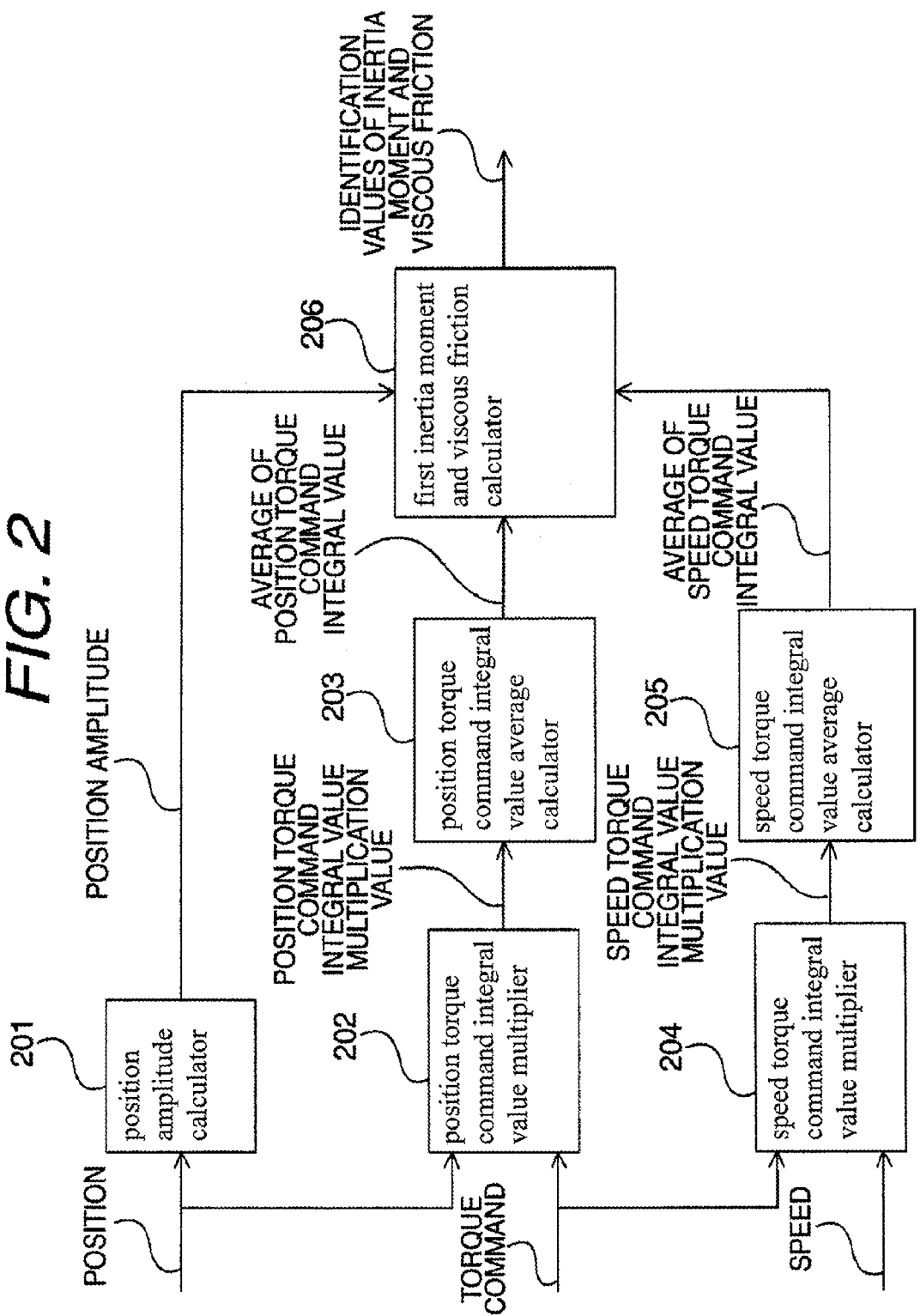
FIG. 2 is a detailed block diagram showing an inertia moment and viscous friction identifier in the system identification device according to the first example.

FIG. 2 is a detailed block diagram showing an inertia moment and viscous friction identifier in the system identification device according to the first example.

In FIG. 2, 201 denotes a position amplitude calculator, 202 denotes a position torque command integral value multiplier, 203 denotes a position torque command integral value average calculator, 204 denotes a speed torque command integral value multiplier, 205 denotes a speed torque command integral value average calculator, and 206 denotes a first inertia moment and viscous friction calculator.

First of all, the detailed structure of the inertia moment and viscous friction identifier 107 according to the first example will be described with reference to FIG. 2. The position amplitude calculator 201 inputs a position and then calculates and outputs a position amplitude to be a fundamental frequency component amplitude of the input signal. The position torque command integral value multiplier 202 inputs the position and a torque command and then calculates and outputs a position torque command integral value multiplication value to be a multiplication value of fundamental frequency component of the position and a 0th-order time integral value of the torque command. The position torque command integral value average calculator 203 inputs the position torque command integral value multiplication value and then calculates and outputs an average of position torque command integral value to be a one-cycle average of the input signal. The speed torque command integral value multiplier 204 inputs the torque command and a speed and then calculates and outputs a speed torque command integral value multiplication value to be a multiplication value of fundamental frequency component of the speed and a 0th-order time integral value of the torque command. The speed torque command integral value average calculator 205 inputs the speed torque command integral value multiplication value and then calculates and outputs an average of speed torque command integral value to be a one-cycle average of the input signal. The first inertia moment and viscous friction calculator 206 inputs the position amplitude, the average of position torque command integral value and the average of speed torque command integral value and then calculates and outputs identification values of inertia moment and viscous friction to be an inertia moment in the electric motor 104 and a viscous friction.

Next, the principle of the inertia moment and viscous friction identifier 107 according to the first example will be described with reference to FIGS. 1 and 2.

An equation of motion of an open loop system including the torque controller 103, the electric motor 104 and the position detector 105 is represented by Equation (7), where an inertia moment of the electric motor 104 is represented by J, a viscous friction is represented by D, a torque command is represented by Tref, a constant torque disturbance is represented by w and a position is represented by θ.

$$J\ddot{\theta} + D\dot{\theta} = T_{ref} - w \tag{7}$$

When a speed command is set to be a sine wave having a frequency ω, the position is also the sine wave having the frequency ω in a steady state and is represented by Equation (8).

$$\theta = A \cos \omega t \tag{8}$$

In this case, A represents a position amplitude.

The Equation (8) is substituted for the Equation (7) to carry out a calculation for the torque command so that Equation (9) is obtained.

$$T_{ref} = J\ddot{\theta} + D\dot{\theta} + w \tag{9}$$
$$= -\omega^2 A J \cos\omega t - \omega A D \sin\omega t + w$$

The position torque command integral value multiplication value output from the position torque command integral value multiplier 202 is represented by Equation (10) based on the Equations (8) and (9).

$$T_{ref}\theta = -\omega^2 A^2 J \cos^2\omega t - \omega A^2 D \cos\omega t \sin\omega t + wA\cos\omega t \tag{10}$$
$$= -\omega^2 A^2 J\left(\frac{1}{2}\cos 2\omega t + \frac{1}{2}\right) - \omega A^2 D \frac{1}{2}\sin 2\omega t + wA\cos\omega t$$

The moment of inertia J is represented by Equation (11) using an average of position torque command integral value to be a one-cycle average in the Equation (10).

$$J = -\frac{2\overline{T_{ref}\theta}}{\omega^2 A^2} \tag{11}$$

Moreover, the speed torque command integral value multiplication value output from the speed torque command integral value multiplier 204 is represented by Equation (12) based on the Equations (8) and (9).

$$T_{ref}\dot{\theta} = \omega^3 A^2 J \cos\omega t \sin\omega t + \omega^2 A^2 D \sin^2\omega t - w\omega A \sin\omega t \tag{12}$$
$$= \omega^3 A^2 J \frac{1}{2}\sin 2\omega t + \omega^2 A^2 D\left(-\frac{1}{2}\cos 2\omega t + \frac{1}{2}\right) - w\omega A \sin\omega t$$

The viscous friction D is represented by Equation (13) using an average of speed torque command integral value to be a one-cycle average in the Equation (12).

$$D = \frac{2\overline{T_{ref}\theta}}{\omega^2 A^2} \quad (13)$$

The first inertia moment and viscous friction calculator 206 can calculate identification values of inertia moment and viscous friction to be the inertia moment J in the electric motor 104 and the viscous friction D using the Equations (11) and (13).

The Equations (11) and (13) do not contain the constant torque disturbance w. Therefore, the constant torque disturbance w does not influence the identification values of inertia moment and viscous friction.

Next, an operation of the inertia moment and viscous friction identifier 107 according to the first example will be described with reference to FIGS. 1 and 2.

The position amplitude calculator 201 calculates a position fundamental frequency component to be a fundamental frequency component of the position and then calculates and outputs the position amplitude to be an amplitude thereof using a Fourier transformation or a band-pass filter. The position torque command integral value multiplier 202 calculates a position fundamental frequency component to be a fundamental frequency component of the position and a torque command integral value fundamental frequency component to be a fundamental frequency component of a 0th-order time integral value of the torque command using the Fourier transformation or the band-pass filter, and then calculates and outputs the position torque command integral value multiplication value to be a multiplication value of the position fundamental frequency component and the torque command integral value fundamental frequency component. The speed torque command integral value multiplier 204 calculates a torque command integral value fundamental frequency component to be a fundamental frequency component of a 0th-order time integral value of the torque command and a speed fundamental frequency component to be a fundamental speed component of the speed using the Fourier transformation or the band-pass filter, and then calculates and outputs the speed torque command integral value multiplication value to be a multiplication value of the torque command integral value fundamental frequency component and the speed fundamental frequency component. The first inertia moment and viscous friction calculator 206 can calculate the identification values of the inertia moment and the viscous friction for any periodic speed command by setting the torque command Tref in the Equations (11) and (13) as a torque command fundamental frequency component and setting the position θ as the position fundamental frequency component.

Thus, the system identification device according to the first example uses a position amplitude, an average of position torque command integral value and an average of speed torque command integral value. In a speed control system having any linear control law, therefore, it is possible to suppress the influence of a constant torque disturbance and to identify an inertia moment in an electric motor and a viscous friction through only a very small operation.

SECOND EXAMPLE

Figure 3:
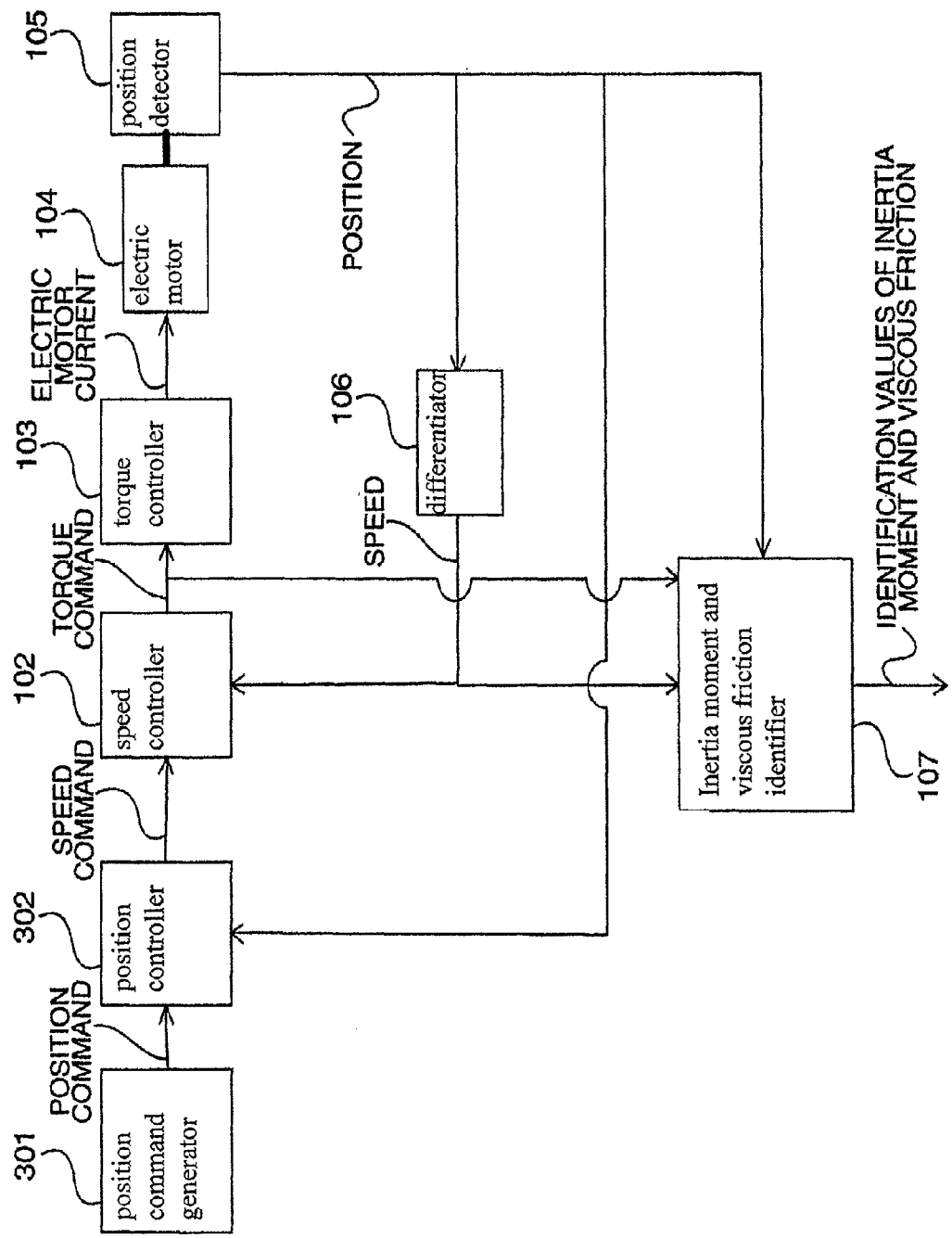
FIG. 3 is a block diagram showing a system identification device according to a second example.

FIG. 3 is a block diagram showing a system identification device according to a second example.

In FIG. 3, 102 denotes a speed controller, 103 denotes a torque controller, 104 denotes an electric motor, 105 denotes a position detector, 106 denotes a differentiator, 107 denotes an inertia moment and viscous friction identifier, 301 denotes a position command generator, and 302 denotes a position controller.

A structure of the system identification device according to the second example will be described below with reference to FIG. 3.

The position command generator 301 outputs a position command. The position controller 302 inputs the position command and a position and then outputs a speed command. The speed controller 102 inputs the speed command and a speed and then outputs a torque command. The torque controller 103 inputs the torque command and then outputs an electric motor current. The electric motor 104 is driven with the electric motor current, and the position is detected and output by the position detector 105. The differentiator 106 inputs the position and then outputs the speed. The inertia moment and viscous friction identifier 107 inputs the torque command, the position and the speed and then calculates and outputs identification values of inertia moment and viscous friction of the inertia moment in the electric motor 104 and the viscous friction.

Since a structure of the inertia moment and viscous friction identifier 107 according to the example is the same as that of the first example, description will be omitted.

A simulation result according to the second example will be described below.

Numeric values used in the simulation are represented by Equation (14).

$J_m = 0.116 \times 10^{-4}$ kg·m$^2$, $J_1 = 0.8164 \times 10^{-4}$ kg·m$^2$,
$J^* = J_m + J_1$ $D^* = 0.001 N \cdot m \cdot s/\text{rad}$, $T_{rat} = 0.637 N \cdot m$ $K_p = 40$ rad/s, $K_v = 40(2\pi)$rad/s, $K_{vj} = K_v J_m$ $T = 125 \times 10^{-6}$s, $u_0 = 0.01$ rad, $\omega = 1(2\pi)$rad/s, $w = 0$ $N \cdot m$ \quad (14)

It is assumed that the electric motor 104 is obtained by applying a rigid load to an electric motor, Jm denotes an electric motor inertia moment, J1 denotes a load inertia moment, J* denotes a net value of an inertia moment of the electric motor 104, D* denotes a net value of a viscous friction, Trat denotes a rated torque, T denotes a control cycle, w denotes a constant torque disturbance, and the position controller 302 is set to be a proportional control having a gain of Kp, the speed controller 102 is set to be a proportional control having a gain of Kvj, and a position command is set to be a sine wave having a frequency of ω and an amplitude of u0.

Figure 4A:
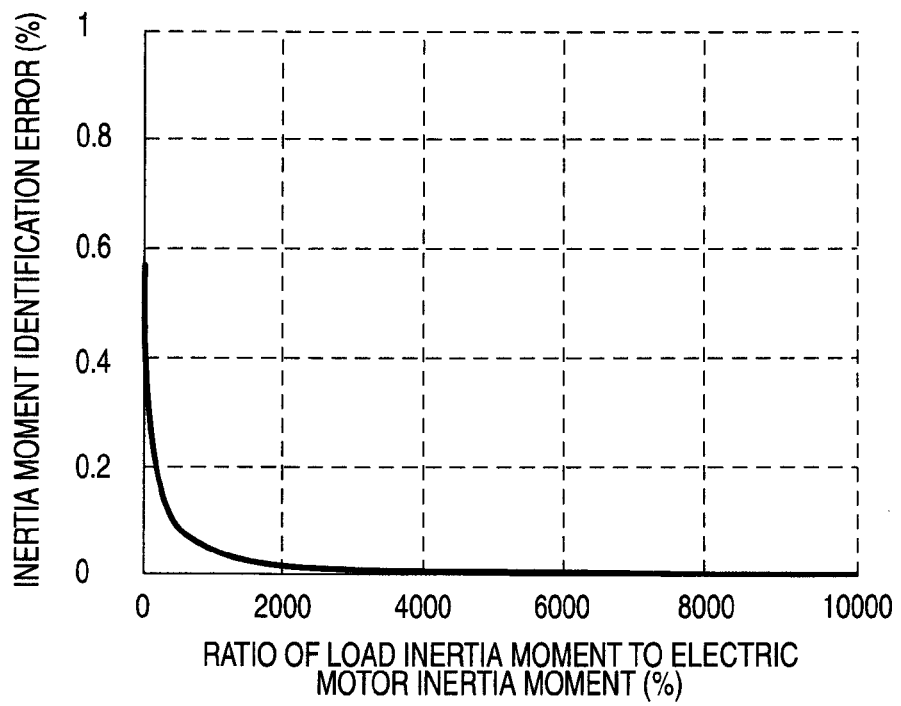
FIGS. 4A and 4B are charts showing simulation results, where a net value of an inertia moment is varied in the system identification device according to the second example.
Figure 4B:
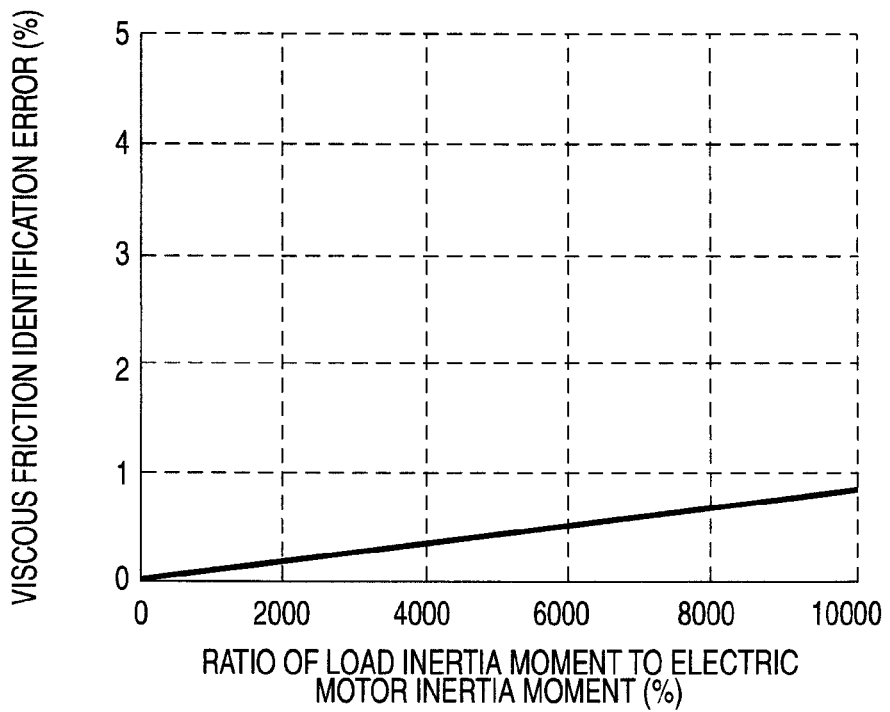

FIGS. 4A and 4B are charts showing simulation results, where a net value of an inertia moment is varied in the system identification device according to the second example. FIG. 4A shows an inertia moment identification error eJ calculated in accordance with Equation (15), where a load inertia moment is varied. FIG. 4B shows a viscous friction identification error eD calculated in accordance with Equation (16), where the load inertia moment is varied.

$$e_J = \frac{|J - J^*|}{J^*} \cdot 100\% \quad (15)$$

$$e_D = \frac{|D - D^*|}{D^*} \cdot 100\% \quad (16)$$

In this case, J represents an inertia moment identification value and D represents a viscous friction identification value.

In FIGS. 4A and 4B, when a ratio J1/Jm of the load inertia moment to an electric motor inertia moment is changed from 0% to 10,000%, the inertia moment identification error is 0.6% or less and the viscous friction identification error is 1% or less. The inertia moment identification error shown in FIG. 4A is increased with a decrease in the load inertia moment because a denominator in the Equation (15) is reduced.

Figure 5A:
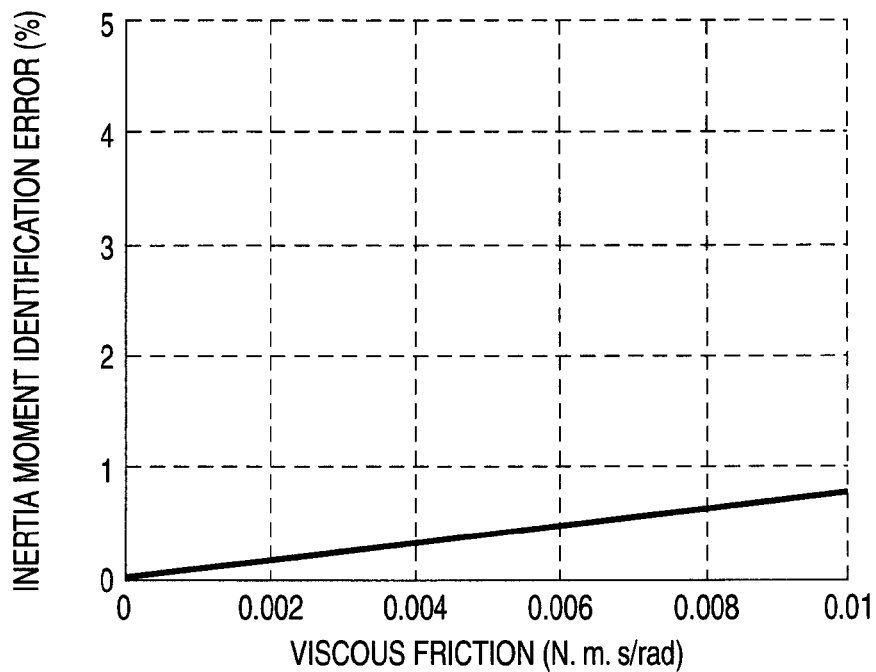
FIGS. 5A and 5B are charts showing simulation results, where a net value of a viscous friction is varied in the system identification device according to the second example.
Figure 5B:
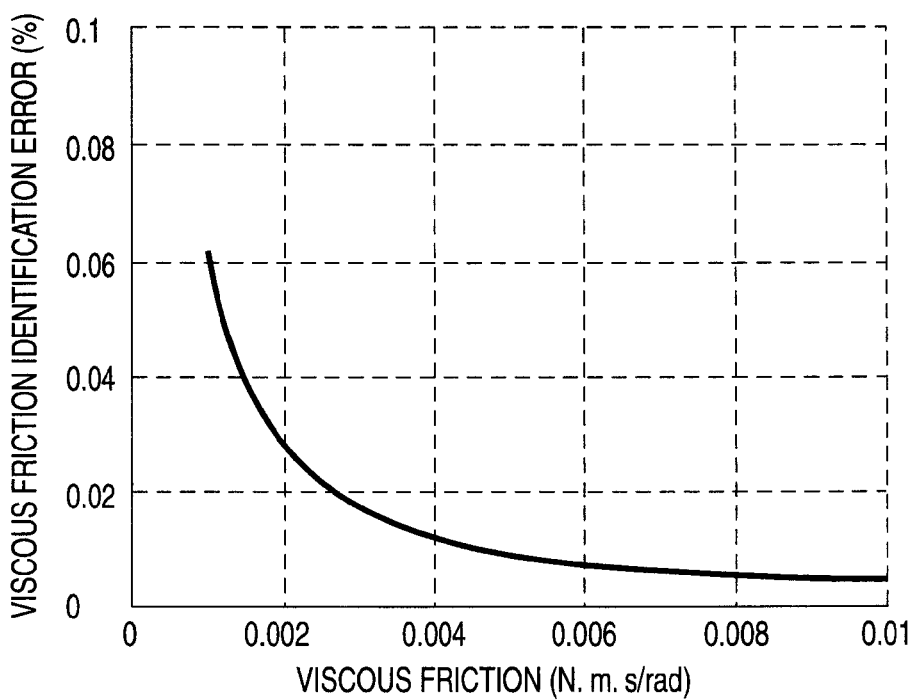

FIGS. 5A and 5B are charts showing a simulation result where a net value of a viscous friction is varied in the system identification device according to the second example. FIG. 5A shows an inertia moment identification error eJ calculated in accordance with the Equation (15), where a viscous friction is varied. FIG. 5B shows a viscous friction identification error eD calculated in accordance with the Equation (16), where the viscous friction is varied. In FIG. 5A, when the viscous friction is changed from 0N*m*s/rad to 0.01N*m*s/rad, the inertia moment identification error is 1% or less. In FIG. 5B, when the viscous friction is changed from 0.001N*m*s/rad to 0.01N*m*s/rad, the viscous friction identification error is 0.06% or less. The viscous friction identification error is increased with a decrease in the viscous friction because a denominator in the Equation (16) approximates to zero.

Figure 6A:
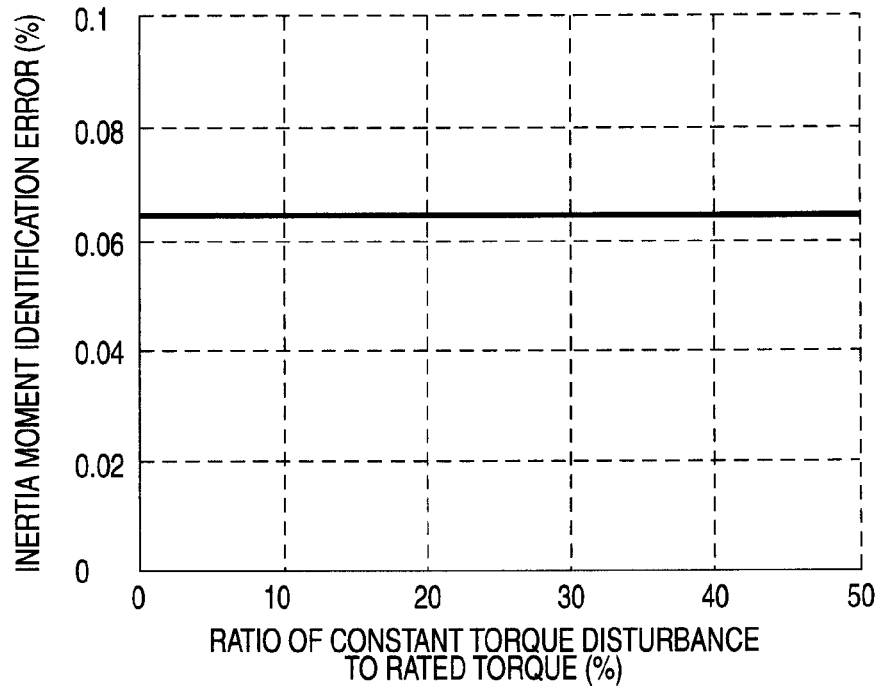
FIGS. 6A and 6B are charts showing simulation results, where a constant torque disturbance is changed in the system identification device according to the second example.
Figure 6B:
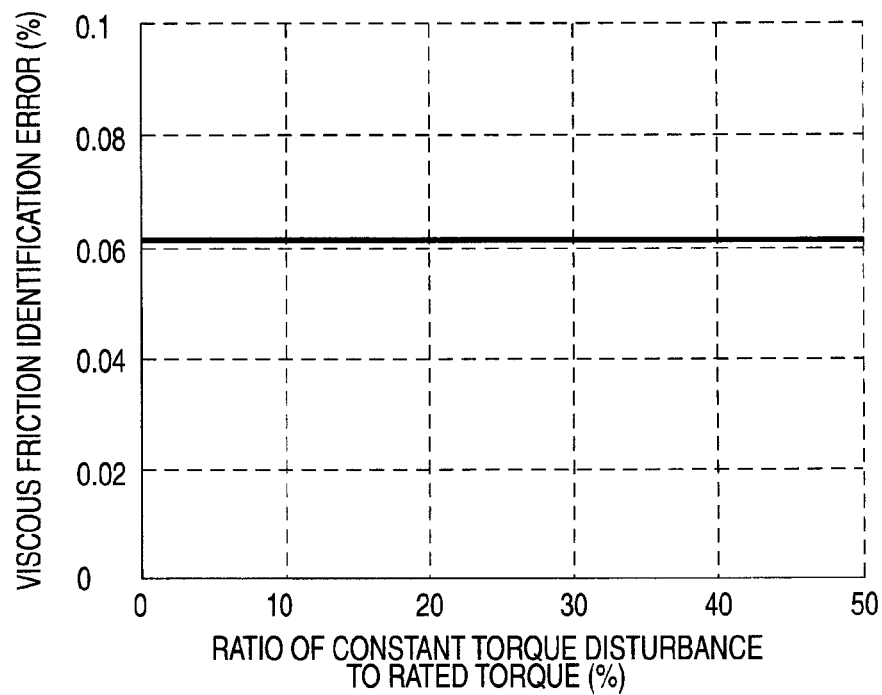

FIGS. 6A and 6B are charts showing simulation results, where a constant torque disturbance is varied in the system identification device according to the second example. FIG. 6A shows the inertia moment identification error eJ calculated in accordance with the Equation (15), where the constant torque disturbance is varied. FIG. 6B shows the viscous friction identification error eD calculated in accordance with the Equation (16), where the constant torque disturbance is varied.

In FIGS. 6A and 6B, when a ratio w/Trat of the constant torque disturbance to a rated torque is changed from 0% to 50%, the inertia moment identification error is 0.07% or less and the viscous friction identification error is 0.07% or less.

In the simulation, a position amplitude is always equal to or smaller than 0.02 rad (417 pulses in a 17-bit encoder).

Thus, the system identification device according to the second example uses the position amplitude, the average of position torque command integral value and the average of speed torque command integral value. In a position control system having any linear control law, therefore, it is possible to suppress the influence of a constant torque disturbance and to identify an inertia moment in an electric motor and a viscous friction through only a very small operation.

THIRD EXAMPLE

The third example is different from the first and second examples in that the third example employs a structure in which a position torque command integral value multiplier 202 and a speed torque command integral value multiplier 204 use a 1st-order time integral value of a torque command in place of a 0th-order time integral value of the torque command. Since other structures are the same as those in the first and second examples, description thereof will be omitted.

First of all, the principle of the example will be described with reference to FIGS. 1, 2 and 3.

An equation of motion of an open loop system including a torque controller 103, an electric motor 104 and a position detector 105 is represented by the Equation (7) according to the first example, where an inertia moment of the electric motor 104 is represented by J, a viscous friction is represented by D, a torque command is represented by Tref, a constant torque disturbance is represented by w and a position is represented by $\theta$. When the speed command or the position command is set to be a sine wave having a frequency of $\omega$, the position is also the sine wave having the frequency of $\omega$ in a steady state and is represented by the Equation (8) according to the first example. The Equation (8) is substituted for the Equation (7) to carry out a calculation for the torque command so that the Equation (9) is obtained. A torque command integral value to be a 1st-order time integral value in the Equation (9) is represented by Equation (17).

$$\int T_{ref} dt = -\omega AJ \sin \omega t + AD \cos \omega t + wt \qquad (17)$$

The position torque command integral value multiplication value is obtained by multiplying the Equations (8) and (17) so that Equation (18) is obtained.

$$\int T_{ref} dt\theta = -\omega A^2 J \cos\omega t \sin\omega t + A^2 D \cos^2\omega t + Awt\cos\omega t \qquad (18)$$

$$= -\frac{\omega A^2 J}{2} \sin 2\omega t + A^2 D \left(\frac{1}{2}\cos 2\omega t + \frac{1}{2}\right) + Awt\cos\omega t$$

The viscous friction D of the electric motor 104 is calculated in accordance with the Equation (18) in the same manner as in the first example so that Equation (19) is obtained.

$$D = \frac{2\overline{\int T_{ref} dt\theta}}{A^2} \qquad (19)$$

In this case, a transverse line indicates a one-cycle average.

Moreover, the speed torque command integral value multiplication value is represented by Equation (20) based on the Equations (8) and (17).

$$\int T_{ref} dt\dot\theta = \omega^2 A^2 J \sin^2\omega t - \omega A^2 D \cos\omega t \sin\omega t - \omega Awt \sin\omega t \qquad (20)$$

$$= \omega^2 A^2 J \left(\frac{1}{2} - \frac{1}{2}\cos 2\omega t\right) -$$

$$\omega A^2 D \frac{1}{2}\sin 2\omega t - \omega Awt\sin\omega t$$

Using the one-cycle average in the Equation (20), the moment of inertia J of the electric motor 104 is obtained by Equation (21).

$$J = \frac{2\overline{\int T_{ref} dt\dot\theta}}{\omega^2 A^2} \qquad (21)$$

The first inertia moment and viscous friction calculator 206 can calculate identification values of inertia moment and viscous friction to be the viscous friction D and the moment of inertia J in the electric motor 104 using the Equations (19) and (21). The Equations (19) and (21) do not contain the constant torque disturbance w. Therefore, the constant torque disturbance w does not influence the identification values of inertia moment and viscous friction. When the torque command includes a noise, a waveform of the torque command integral value is smoother than that of the torque command. By using the Equations (19) and (21), it is possible to suppress the influence of the noise on the identification values of inertia moment and viscous friction.

Next, an operation according to the third example will be described with reference to FIGS. 1 to 3.

A position amplitude calculator 201 calculates a position fundamental frequency component to be a fundamental frequency component of the position and then calculates and outputs the position amplitude to be an amplitude thereof using a Fourier transformation or a band-pass filter. The position torque command integral value multiplier 202 calculates a position fundamental frequency component to be a fundamental frequency component of the position and a torque command integral value fundamental frequency component to be a fundamental frequency component of a 1st-order time integral value of the torque command using the Fourier transformation or the band-pass filter, and then calculates and outputs the position torque command integral value multiplication value to be a multiplication value of the position fundamental frequency component and the torque command integral value fundamental frequency component. The speed torque command integral value multiplier 204 calculates a torque command integral value fundamental frequency component to be a fundamental frequency component of a 1st-order time integral value of the torque command and a speed fundamental frequency component to be a fundamental frequency component of the speed using the Fourier transformation or the band-pass filter, and then calculates and outputs the speed torque command integral value multiplication value to be a multiplication value of the torque command integral value fundamental frequency component and the speed fundamental frequency component. The first inertia moment and viscous friction calculator 206 can calculate the identification values of inertia moment and viscous friction for any periodic speed command or periodic position command by setting the torque command Tref in the Equations (19) and (21) as a torque command fundamental frequency component and setting the position θ as the position fundamental frequency component.

Even when an Nth-order time integral value of the torque command is used in place of the 1st-order time integral value of the torque command, wherein N is set to a natural number including zero; that is, even when the position torque command integral value multiplier 202 is constituted to calculate and output a position torque command integral value multiplication value to be a multiplication value of fundamental frequency component of the position and the Nth-order time integral value of the torque command when the position and the torque command are input and N is set to the natural number including zero, and the speed torque command integral value multiplier 204 is constituted to calculate and output a speed torque command integral value multiplication value to be a multiplication value of fundamental frequency component of the speed and the Nth-order time integral value of the torque command when the torque command and the speed are input and N is set to be the natural number including zero; the first inertia moment and viscous friction calculator 206 can calculate the identification values of the inertia moment and the viscous friction in the same manner as in the example.

Thus, the system identification device according to the third example uses a position amplitude, an average of position torque command integral value and an average of speed torque command integral value. Therefore, it is possible to suppress the influence of a constant torque disturbance and to control the influence of a noise in a torque command, thereby identifying an inertia moment in an electric motor and a viscous friction through only a very small operation.

FOURTH EXAMPLE

Figure 7:
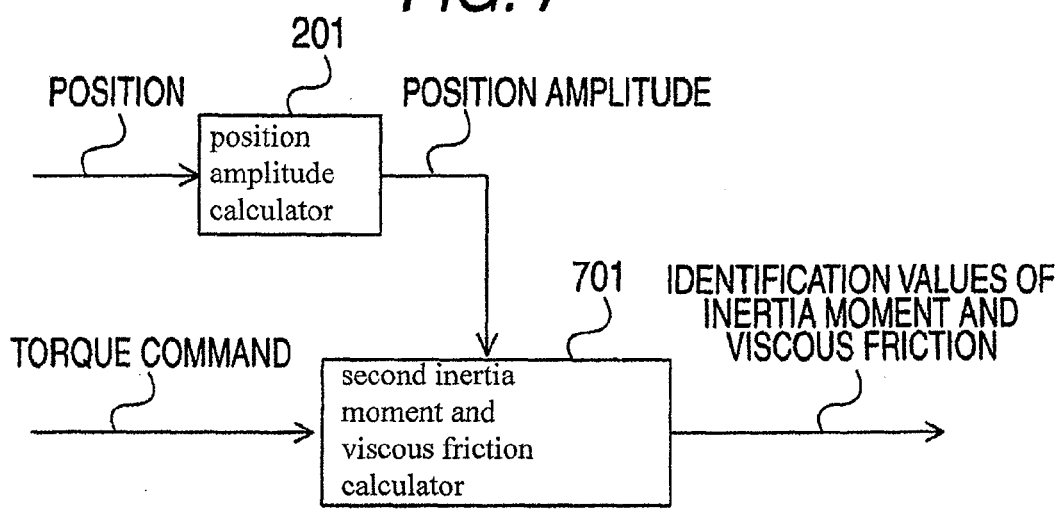
FIG. 7 is a detailed block diagram showing an inertia moment and viscous friction identifier in a system identification device according to a fourth example.
Figure 8:
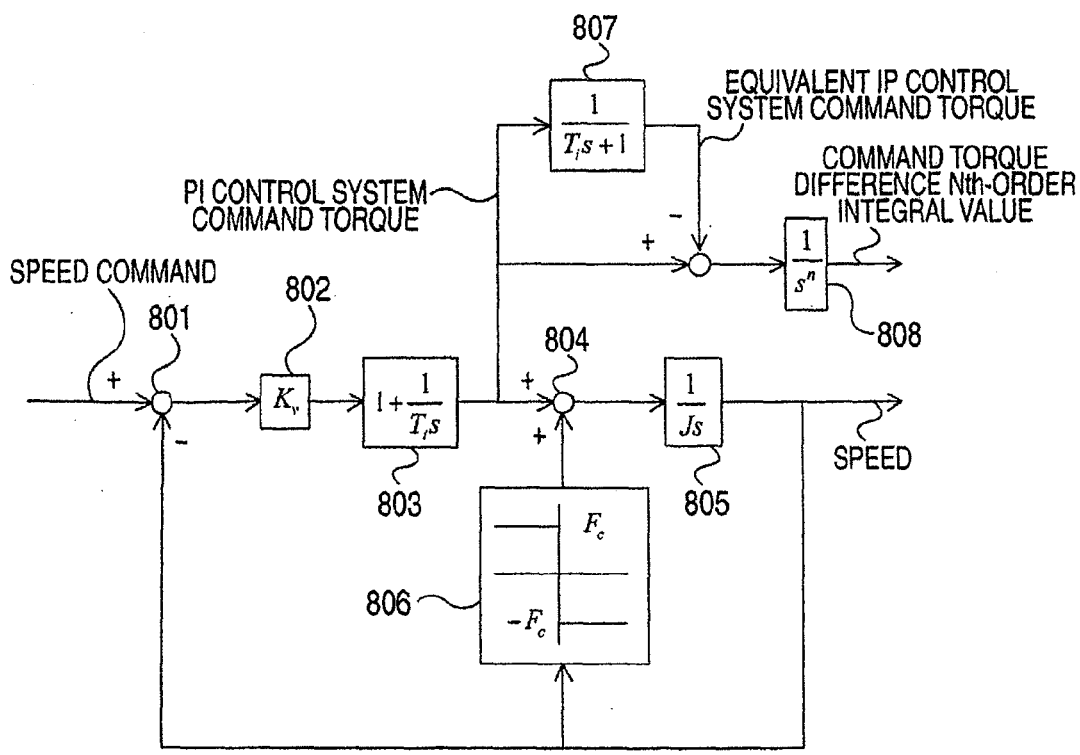
FIG. 8 is a block diagram showing a system identification device according to the related art.

FIG. 7 is a detailed block diagram showing an inertia moment and viscous friction identifier in a system identification device according to a fourth example.

In FIG. 7, 201 denotes a position amplitude calculator and 701 denotes a second inertia moment and viscous friction calculator.

The fourth example is different from the first, second and third examples in that an inertia moment and viscous friction identifier 107 according to the fourth example is constituted by: a position amplitude calculator 201 for inputting the position and then calculating and outputting a position amplitude to be a fundamental frequency component amplitude of the input signal; and a second inertia moment and viscous friction calculator 701 for inputting the position amplitude and the torque command, and then calculating a Fourier coefficient of the torque command through a Fourier transformation and then calculating and outputting the identification values of the inertia moment and the viscous friction by using the position amplitude and the Fourier coefficient.

A principle and operation according to the invention will be described below with reference to FIGS. 1, 3 and 7.

The position amplitude calculator 201 calculates a position fundamental frequency component represented by Equation (22) using the Fourier transformation.

$$\theta_0 = A \cos \omega t \tag{22}$$

Here, A denotes the position amplitude and ω denotes a fundamental frequency of the speed command or the position command.

The second inertia moment and viscous friction calculator 701 calculates a torque command fundamental frequency component represented by Equation (23) using the Fourier transformation.

$$T_{ref0} = a_0 \cos \omega t + b_0 \sin \omega t \tag{23}$$

Here, a0 and b0 represent Fourier coefficients.
Equation (24) is obtained from the Equations (22) and (23).

$$\begin{aligned} T_{ref0}\theta_0 &= a_0 A \cos^2 \omega t + b_0 A \cos \omega t \sin \omega t \\ &= a_0 A \left( \frac{1}{2} \cos 2\omega t + \frac{1}{2} \right) + b_0 A \frac{1}{2} \sin 2\omega t \end{aligned} \tag{24}$$

Equation (25) is obtained from a one-cycle average of the Equation (24).

$$\overline{T_{ref0}\theta_0} = \frac{a_0 A}{2} \tag{25}$$

Using the Equation (25), an inertia moment J of an electric motor 104 is obtained in accordance with Equation (26) in FIG. 1 or 3 in the same manner as in the Equation (11) according to the first example.

$$J = -\frac{a_0}{\omega^2 A} \tag{26}$$

Equation (27) is obtained from the Equations (22) and (23).

$$\begin{aligned} T_{ref0}\dot{\theta}_0 &= -a_0 \omega A \cos \omega t \sin \omega t - b_0 \omega A \sin^2 \omega t \\ &= -a_0 \omega A \frac{1}{2} \sin 2\omega t - b_0 \omega A \left( -\frac{1}{2} \cos 2\omega t + \frac{1}{2} \right) \end{aligned} \tag{27}$$

Equation (28) is obtained from a one-cycle average of the Equation (27).

$$\overline{T_{ref0}\theta_0} = -\frac{b_0\omega A}{2} \quad (28)$$

A viscous friction D of the electric motor 104 is given by Equation (29) using the Equation (28) in the same manner as in the Equation (13).

$$D = -\frac{b_0}{\omega A} \quad (29)$$

The second inertia moment and viscous friction calculator 701 can calculate identification values of inertia moment and viscous friction to be the inertia moment J in the electric motor 104 and the viscous friction D using the Equations (26) and (29). The Equations (26) and (29) do not include a constant torque disturbance w. Therefore, the constant torque disturbance w does not influence the identification values of the inertia moment and the viscous friction.

Thus, the system identification device according to the example uses the Fourier coefficients of the position amplitude and the torque command fundamental frequency component. Therefore, it is possible to identify the inertia moment in an electric motor and the viscous friction through only a very small operation in a short time while suppressing the influence of a constant torque disturbance for any linear control law through only a simple calculation using any periodic speed command or periodic position command.

INDUSTRIAL APPLICABILITY

By using a position amplitude, an average of position torque command integral value and an average of speed torque command integral value, it is possible to identify an inertia moment in an electric motor and a viscous friction through only a very small operation. Therefore, it is possible to widely apply to apparatuses for general industry such as a chip mounter.

The invention claimed is:

1. A system identification device comprising:
a speed command generator for outputting a speed command;
a differentiator for inputting a position of an electric motor detected by a position detector and then outputting a speed;
a speed controller for inputting the speed command and the speed and then outputting a torque command;
a torque controller for inputting the torque command and then driving the electric motor with an electric motor current; and
an inertia moment and viscous friction identifier for inputting the torque command, the position and the speed, and then calculating and outputting identification values of an inertia moment in the electric motor and a viscous friction,
wherein the inertia moment and viscous friction identifier includes: a position amplitude calculator for inputting the position and then calculating and outputting a position amplitude to be an amplitude of a fundamental frequency component of the position;
a position torque command integral value multiplier for inputting the position and the torque command, and then calculating and outputting a position torque command integral value multiplication value to be a multiplication value of the fundamental frequency component of the position and an Nth-order time integral value of the torque command, wherein N is set to a natural number including zero;
a position torque command integral value average calculator for inputting the position torque command integral value multiplication value and then calculating and outputting an average of a position torque command integral value to be a one-cycle average of the input signal;
a speed torque command integral value multiplier for inputting the torque command and the speed, and then calculating and outputting a speed torque command integral value multiplication value to be a multiplication value of a fundamental frequency component of the speed and the Nth-order time integral value of the torque command;
a speed torque command integral value average calculator for inputting the speed torque command integral value multiplication value, and then calculating and outputting an average of a speed torque command integral value to be a one-cycle average of the input signal; and
a first inertia moment and viscous friction calculator for inputting the position amplitude, the average of the position torque command integral value and the average of the speed torque command integral value, and then calculating and outputting the identification values of the inertia moment and the viscous friction.

2. The system identification device according to claim 1, wherein
when a fundamental frequency of the speed command is represented by $\omega$, a torque command fundamental frequency component is represented by Tref0, the fundamental frequency component of the position is represented by $\theta0$, and the position amplitude is represented by A,
the first inertia moment and viscous friction calculator calculates the identification values of the inertia moment J in the electric motor and the viscous friction D in accordance with the following Equations (1) and (2):

$$J = -\frac{2\overline{T_{ref0}\theta_0}}{\omega^2 A^2} \quad (1)$$

$$D = \frac{2\overline{T_{ref0}\dot{\theta}_0}}{\omega^2 A^2}. \quad (2)$$

3. The system identification device according to claim 1, wherein
when a fundamental frequency of the speed command is represented by $\omega$, a torque command fundamental frequency component is represented by Tref0, a position fundamental frequency component is represented by $\theta0$, and the position amplitude is represented by A,
the first inertia moment and viscous friction calculator calculates the identification values of the inertia moment J in the electric motor and the viscous friction D in accordance with the following Equations (3) and (4):

$$J = \frac{2\overline{\int T_{ref0}dt\,\dot{\theta}_0}}{\omega^2 A^2} \quad (3)$$

$$D = \frac{2\overline{\int T_{ref0}dt\,\theta_0}}{A^2}. \quad (4)$$

4. A system identification device comprising:
a position command generator for outputting a position command;
a differentiator for inputting a position of an electric motor detected by a position detector and then outputting a speed;
a position controller for inputting the position command and the position and then outputting a speed command;
a speed controller for inputting the speed command and the speed and then outputting a torque command;
a torque controller for inputting the torque command and then driving the electric motor with an electric motor current; and
an inertia moment and viscous friction identifier for inputting the torque command, the position and the speed, and then calculating and outputting identification values of an inertia moment in the electric motor and a viscous friction,
wherein the inertia moment and viscous friction identifier includes:
a position amplitude calculator for inputting the position and then calculating and outputting a position amplitude to be an amplitude of a fundamental frequency component of an input signal;
a position torque command integral value multiplier for inputting the position and the torque command, and then calculating and outputting a position torque command integral value multiplication value to be a multiplication value of a fundamental frequency component of the position and an Nth-order time integral value of the torque command, wherein N is set to a natural number including zero;
a position torque command integral value average calculator for inputting the position torque command integral value multiplication value and then calculating and outputting an average of a position torque command integral value to be a one-cycle average of the input signal;
a speed torque command integral value multiplier for inputting the torque command and the speed, and then calculating and outputting a speed torque command integral value multiplication value to be a multiplication value of a fundamental frequency component of the speed and the Nth-order time integral value of the torque command;
a speed torque command integral value average calculator for inputting the speed torque command integral value multiplication value, and then calculating and outputting an average of a speed torque command integral value to be a one-cycle average of the input signal; and
a first inertia moment and viscous friction calculator for inputting the position amplitude, the average of the position torque command integral value and the average of the speed torque command integral value, and then calculating and outputting the identification values of the inertia moment and the viscous friction.

5. The system identification device according to claim 1 or 4, wherein the position torque command integral value multiplier and the speed torque command integral value multiplier set the Nth-order time integral value of the torque command to be a 0th-order time integral value of the torque command.

6. The system identification device according to claim 1 or 4, wherein the position torque command integral value multiplier and the speed torque command integral value multiplier set the Nth-order time integral value of the torque command to be a 1st-order time integral value of the torque command.

7. The system identification device according to claim 1 or 4, wherein the position amplitude calculator calculates a position fundamental frequency component to be the fundamental frequency component of the position, and then calculates and outputs the position amplitude using a Fourier transformation,
the position torque command integral value multiplier calculates a position fundamental frequency component to be the fundamental frequency component of the position and a torque command fundamental frequency component to be the fundamental frequency component of the torque command using the Fourier transformation, and then calculates and outputs the position torque command integral value multiplication value to be a multiplication value of the position fundamental frequency component and an Nth-order time integral value of the torque command fundamental frequency component, and
the speed torque command integral value multiplier calculates a torque command fundamental frequency component to be the fundamental frequency component of the torque command and a speed fundamental frequency component to be the fundamental frequency component of the speed using the Fourier transformation, and then calculates and outputs the speed torque command integral value multiplication value to be a multiplication value of the Nth-order time integral value of the torque command fundamental frequency component and the speed fundamental frequency component.

8. The system identification device according to claim 1 or 4, wherein the position amplitude calculator calculates a position fundamental frequency component to be the fundamental frequency component of the position, and then calculates and outputs the position amplitude using a band-pass filter,
the position torque command integral value multiplier calculates a position fundamental frequency component to be the fundamental frequency component of the position and a torque command fundamental frequency component to be the fundamental frequency component of the torque command using the band-pass filter, and then calculates and outputs the position torque command integral value multiplication value to be a multiplication value of the position fundamental frequency component and an Nth-order time integral value of the torque command fundamental frequency component, and
the speed torque command integral value multiplier calculates a torque command fundamental frequency component to be the fundamental frequency component of the torque command and a speed fundamental frequency component to be the fundamental frequency component of the speed using the band-pass filter, and then calculates and outputs the speed torque command integral value multiplication value to be a multiplication value of the Nth-order time integral value of the torque command fundamental frequency component and the speed fundamental frequency component.

9. The system identification device according to claim 4, wherein
when fundamental frequency of the position command is represented by $\omega$, a torque command fundamental frequency component is represented by $Tref0$, the fundamental frequency component of the position is represented by $\theta0$, and the position amplitude is represented by $A$,
the first inertia moment and viscous friction calculator calculates the identification values of the inertia moment J in the electric motor and the viscous friction D in accordance with the following Equations (1) and (2):

$$J = -\frac{2\overline{T_{ref0}\theta_0}}{\omega^2 A^2} \quad (1)$$

$$D = \frac{2\overline{T_{ref0}\dot{\theta}_0}}{\omega^2 A^2}. \quad (2)$$

10. The system identification device according to claim 4, wherein when a fundamental frequency of the position command is represented by ω, a torque command fundamental frequency component is represented by Tref0, a position fundamental frequency component is represented by θ0, and the position amplitude is represented by A, the first inertia moment and viscous friction calculator calculates the identification values of the inertia moment J in the electric motor and the viscous friction D in accordance with the following Equations (3) and (4):

$$J = \frac{2\overline{\int T_{ref0} dt \dot{\theta}_0}}{\omega^2 A^2} \quad (3)$$

$$D = \frac{2\overline{\int T_{ref0} dt \theta_0}}{A^2}. \quad (4)$$

* * * * *